United States Patent
Nagai

(10) Patent No.: US 8,468,226 B2
(45) Date of Patent: Jun. 18, 2013

(54) MANAGEMENT SERVER, BOOT SERVER, NETWORK BOOT SYSTEM, AND NETWORK BOOT METHOD

(75) Inventor: Kazuya Nagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 13/229,135

(22) Filed: Sep. 9, 2011

(65) Prior Publication Data

US 2012/0005472 A1    Jan. 5, 2012

Related U.S. Application Data

(63) Continuation of application No. PCT/JP2009/056579, filed on Mar. 30, 2009.

(51) Int. Cl.
*G06F 15/177* (2006.01)

(52) U.S. Cl.
USPC ............................ 709/222; 709/208; 709/229

(58) Field of Classification Search
USPC ................. 709/222, 220, 221, 223, 224, 229, 709/203, 208; 713/1, 155, 201
See application file for complete search history.

(56) References Cited

U.S. PATENT DOCUMENTS

| | | | |
|---|---|---|---|
| 6,421,777 B1 * | 7/2002 | Pierre-Louis et al. ............. | 713/2 |
| 6,446,203 B1 | 9/2002 | Aguilar et al. | |
| 6,751,658 B1 * | 6/2004 | Haun et al. ..................... | 709/222 |
| 7,233,985 B2 * | 6/2007 | Hahn et al. ..................... | 709/222 |
| 7,334,157 B1 * | 2/2008 | Graf et al. ........................ | 714/13 |
| 7,664,110 B1 * | 2/2010 | Lovett et al. ................... | 370/392 |
| 7,849,168 B2 * | 12/2010 | Utsunomiya et al. .......... | 709/221 |
| 7,941,814 B1 * | 5/2011 | Okcu et al. ..................... | 719/324 |
| 7,971,045 B1 * | 6/2011 | Currid et al. ....................... | 713/1 |
| 8,302,091 B2 * | 10/2012 | Aridor et al. ................... | 717/174 |
| 2002/0091929 A1 * | 7/2002 | Ehrensvard .................... | 713/181 |
| 2003/0126242 A1 * | 7/2003 | Chang ............................ | 709/222 |
| 2003/0145061 A1 | 7/2003 | Kochiya | |
| 2005/0149924 A1 * | 7/2005 | Komarla et al. ............... | 717/176 |
| 2005/0223210 A1 | 10/2005 | Sasaki et al. | |
| 2006/0129797 A1 | 6/2006 | Durfee et al. | |
| 2006/0206699 A1 * | 9/2006 | Yokota et al. ....................... | 713/1 |
| 2007/0083748 A1 | 4/2007 | Erickson et al. | |
| 2008/0082680 A1 * | 4/2008 | Grewal et al. .................. | 709/232 |
| 2008/0082809 A1 | 4/2008 | Rothman et al. | |
| 2008/0155245 A1 | 6/2008 | Lipscombe et al. | |

(Continued)

FOREIGN PATENT DOCUMENTS

| | | |
|---|---|---|
| GB | 2442348 | 4/2008 |
| JP | 2003-216593 | 7/2003 |

(Continued)

OTHER PUBLICATIONS

International Search Report for PCT/JP2009/056579, mailed Jun. 23, 2009.
Extended European Search Report dated Aug. 1, 2012 issued in corresponding European Patent Application No. 09842983.0.

*Primary Examiner* — Lashonda Jacobs
(74) *Attorney, Agent, or Firm* — Staas & Halsey LLP

(57) ABSTRACT

The management server saves boot images corresponding to boot nodes that are connected to itself through a network. When condition information is received from the boot server provided in each network, the management server transmits a boot image specified by the condition information to the boot server. The boot server provides the boot image received from the management server to the boot node to make the boot node perform a network boot.

11 Claims, 17 Drawing Sheets

U.S. PATENT DOCUMENTS

| | | |
|---|---|---|
| 2008/0162919 A1 | 7/2008 | Zimmer et al. |
| 2008/0209450 A1* | 8/2008 | Hernandez et al. ........... 719/326 |
| 2008/0263181 A1 | 10/2008 | Nagata |
| 2009/0049295 A1* | 2/2009 | Erickson et al. ................... 713/2 |
| 2009/0113029 A1* | 4/2009 | Abels et al. .................... 709/222 |
| 2009/0129597 A1* | 5/2009 | Zimmer et al. ............... 380/277 |
| 2011/0276671 A1* | 11/2011 | Cain et al. ..................... 709/222 |

FOREIGN PATENT DOCUMENTS

| | | |
|---|---|---|
| JP | 2005-149334 | 6/2005 |
| JP | 2005-292922 | 10/2005 |
| JP | 2006-11506 | 1/2006 |
| JP | 2006-277277 | 10/2006 |
| JP | 2008-269395 | 11/2008 |

\* cited by examiner

| CONDITION INFORMATION | | BOOT IMAGE |
|---|---|---|
| Model NAME | RAID Card | |
| M1 | YES | IM1 |
| M1 | NO | IM2 |
| M2 | YES | IM3 |
| M2 | NO | IM4 |
| M3 | YES | IM5 |
| M3 | NO | IM6 |
| ⋮ | ⋮ | ⋮ |

| MAC ADDRESS | CONDITION INFORMATION | |
|---|---|---|
| | Model NAME | RAID Card |
| N10a-1 | M1 | YES |
| N10b-1 | M2 | YES |
| N10c-1 | M2 | NO |
| ⋮ | ⋮ | ⋮ |
| N10a-n | M1 | NO |
| N10b-n | M3 | YES |
| ⋮ | ⋮ | ⋮ |

FIG.7

| CONDITION INFORMATION ITEM (EXAMPLE) | INFORMATION (EXAMPLE) |
|---|---|
| MAC ADDRESS | 00-11-22-33-44-55 |
| Model | MACHINE V101 |
| BIOS | 1.52C |
| Firmware | 3F01 |
| CPU Type | Pentium4 |
| RAID Card Vendor | not installed |
| RAID Card Version | Ver5 |

| MAC ADDRESS | CONDITION INFORMATION |
| --- | --- |
|  | MACHINE TYPE |
| N10a-1 | TYPE1 |
| N10b-1 | TYPE2 |
| N10c-1 | TYPE2 |
| ⋮ | ⋮ |
| N10a-n | TYPE3 |
| N10b-n | TYPE1 |
| ⋮ | ⋮ |

MANAGEMENT SERVER, BOOT SERVER, NETWORK BOOT SYSTEM, AND NETWORK BOOT METHOD

CROSS-REFERENCE TO RELATED APPLICATION

This application is a continuation of International Application No. PCT/JP2009/056579, filed on Mar. 30, 2009, the entire contents of which are incorporated herein by reference.

FIELD

An embodiment of the present invention relates to a management server, a boot server, a network boot system, and a network boot method.

BACKGROUND

Some devices of information processing devices such as servers can acquire a boot image from a server connected to a network and perform a network boot by using the acquired boot image. In the present application, it is assumed that an information processing device that performs a network boot is referred to as a "boot node" and a server that provides a boot image to the boot node is referred to as a "boot server".

A boot server is generally connected to a plurality of boot nodes. The boot server saves correspondence information between identification information for identifying each boot node and a boot image to be provided to the corresponding boot node, and selects a boot image to be provided to the boot node on the basis of the correspondence information. For example, a boot server that employs a PXE (Pre-boot Execution Environment) standard saves a boot image in association with a MAC (Media Access Control) address of a boot node.

There has been recently known a boot server that changes a boot image to be suited for each boot node on the basis of the hardware configuration of the boot node and provides the changed boot image to the boot node.

Patent Document 1: Japanese Laid-open Patent Publication No. 2003-216593
Patent Document 2: Japanese Laid-open Patent Publication No. 2006-277277

The boot server described above is provided for each predetermined network or operating environment. For this reason, a system manager or the like updates a boot image saved in a boot server of each network when the version of the boot image is changed or when a new boot image is created.

For example, when the "A" company, the "B" company, and the "C" company construct different networks, boot servers are provided in the respective networks of the "A" to "C" companies. In such a situation, when a boot image has a bug, for example, an enterpriser who provides the boot image informs the "A" to "C" companies of the effect that the boot image has a bug. Then, a worker of the enterpriser applies a modified boot image to each boot server of the "A" to "C" companies. Alternatively, each system manager of the "A" to "C" companies applies a modified boot image to the corresponding boot server. In this way, when a conventional network boot system is used, production costs of a worker or a system manager increase because maintenance is performed on a boot image every operating environment.

SUMMARY

According to an aspect of an embodiment of the invention, a network boot system includes a management server and a boot server that is connected to nodes that perform a network boot, the management server including an image storage unit that stores therein boot images in association with condition information for specifying boot images corresponding to the nodes; and an image selecting unit that selects a boot image stored in the image storage unit on the basis of condition information included in an image acquisition request for acquiring a boot image received from the boot server, and the boot server including an image acquiring unit that transmits an image acquisition request including condition information for the node to the management server when receiving an instruction for performing the network boot on any node, and acquires the boot image selected by the image selecting from the management server; and a boot instructing unit that instructs the node to perform the network boot by using the boot image acquired by the image acquiring unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of an image storage unit;

FIG. 4 is a diagram illustrating an example of a condition information storage unit;

FIG. 7 is a diagram illustrating an example of condition information;

FIG. 8 is a diagram illustrating an example of the condition information storage unit when condition information is set optionally;

DESCRIPTION OF EMBODIMENTS

Hereinafter, embodiments for a management server, a boot server, a network boot system, a network boot method, a boot image selection program, and a boot image provision program are explained with reference to drawings. Herein, the management server, the boot server, the network boot system, and the like are not limited to the embodiments disclosed herein.

[a] First Embodiment

Configuration of Network Boot System by First Embodiment

Figure 1:
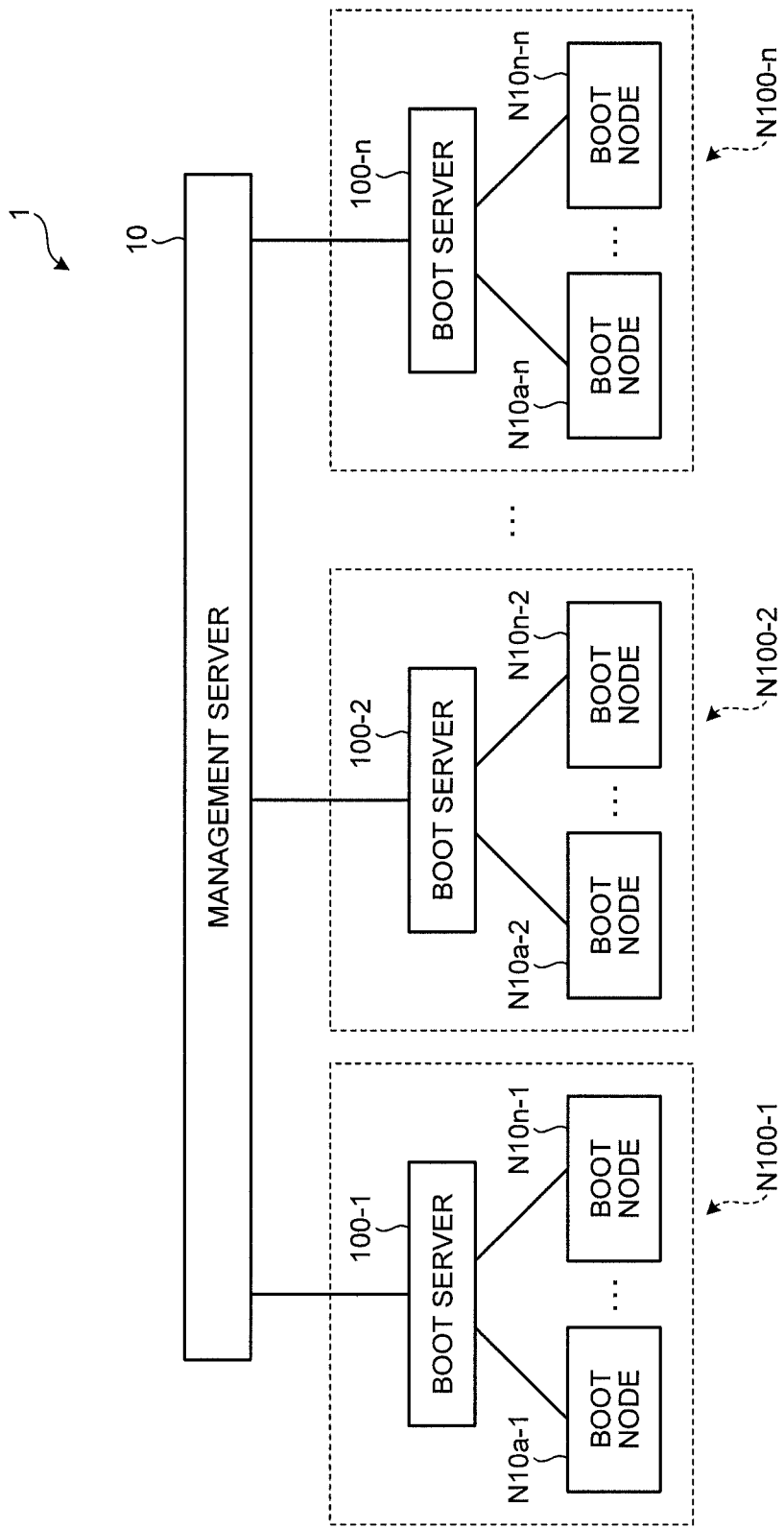
FIG. 1 is a diagram illustrating an example configuration of a network boot system according to a first embodiment.

FIG. 1 is a diagram illustrating an example configuration of a network boot system 1 according to the first embodiment. As illustrated in FIG. 1, the network boot system 1 according to the first embodiment includes a management server 10 and networks N100-1 to N100-*n* that are connected to the management server 10.

The management server 10 saves a boot image corresponding to each boot node in association with a condition (hereinafter, "condition information") for specifying a boot image corresponding to each boot node. Herein, the term "condition information" indicates, for example, the model name or the hardware configuration of a boot node. A boot image is created with appropriate operating system and software in accordance with the configuration of a boot node. In other words, it is demanded that a boot image be an image suitable for a boot node.

The network N100-1 includes a boot server 100-1 and boot nodes N10*a*-1 to N10*n*-1. Herein, the networks N100-1 to N100-*n* have the same configuration. Hereinafter, it will be mainly explained about the network N100-1 among the networks N100-1 to N100-*n*.

The boot server 100-1 provides boot images to the boot nodes N10*a*-1 to N10*n*-1. Specifically, when the boot nodes N10*a*-1 to N10*n*-1 are booted by using network booting, the boot server 100-1 acquires boot images corresponding to the boot nodes N10*a*-1 to N10*n*-1 from the management server 10. Then, the boot server 100-1 provides the acquired boot images to the boot nodes N10*a*-1 to N10*n*-1.

The boot nodes N10*a*-1 to N10*n*-1 are an information processing device such as a personal computer. When performing a boot process, each of the boot nodes N10*a*-1 to N10*n*-1 reads out its own boot image from the boot server 100-1 and performs a network boot.

In the example illustrated in FIG. 1, it will be explained about the case where the boot node N10*a*-1 performs a network boot. When receiving an instruction for performing the network boot on the boot node N10*a*-1 from a predetermined device, the boot server 100-1 transmits condition information for the boot node N10*a*-1 to the management server 10.

Herein, the previously-described "predetermined device" is a device that transmits an instruction for performing the network boot on the boot node N10*a*-1 to the boot server 100-1. For example, the predetermined device is a predetermined information processing device not-illustrated or the boot node N10*a*-1.

The management server 10 selects a boot image corresponding to the condition information received from the boot server 100-1, and transmits the selected boot image to the boot server 100-1. The boot server 100-1 arranges the boot image received from the management server 10 in a predetermined storage area. Then, the boot server 100-1 instructs the boot node N10*a*-1 to perform the network boot.

The boot node N10*a*-1 that receives the instruction for performing the network boot from the boot server 100-1 reads out the boot image arranged in the boot server 100-1 and performs the network boot by using the read boot image.

When the boot servers 100-1 to 100-*n* may not be individually specified in the following descriptions, the boot servers 100-1 to 100-*n* are collectively referred to as a boot server 100. Moreover, when the boot nodes N10*a*-1 to N10*n*-1, N10*a*-2 to N10*n*-2, and N10*a*-*n* to N10*n*-*n* may not be individually specified, the boot nodes are collectively referred to as a boot node N10.

As described above, in the network boot system 1 according to the first embodiment, the management server 10 saves boot images corresponding to each the boot node N10. Then, when receiving condition information corresponding to any the boot node N10 from the boot server 100 provided in each network, the management server 10 selects a boot image corresponding to the boot node N10 and transmits the selected boot image to the boot server 100. As a result, the network boot system 1 according to the first embodiment can make the boot servers 100 provided in the different networks (operating environments) share several boot images.

Then, the boot server 100 provides the boot image received from the management server 10 to the boot node N10 to make the boot node N10 perform a network boot. As a result, the network boot system 1 according to the first embodiment can provide a boot image suitable for each the boot node N10 to the boot node N10.

Because the management server 10 manages boot images corresponding to the boot nodes N10 in block, it is enough for a worker to update a boot image saved in the management server 10 even when the version of the boot image is changed. In other words, the network boot system 1 according to the first embodiment can reduce maintenance costs for a boot image.

Configuration of Management Server 10, Boot Server 100, and Boot Node N10

Figure 2:
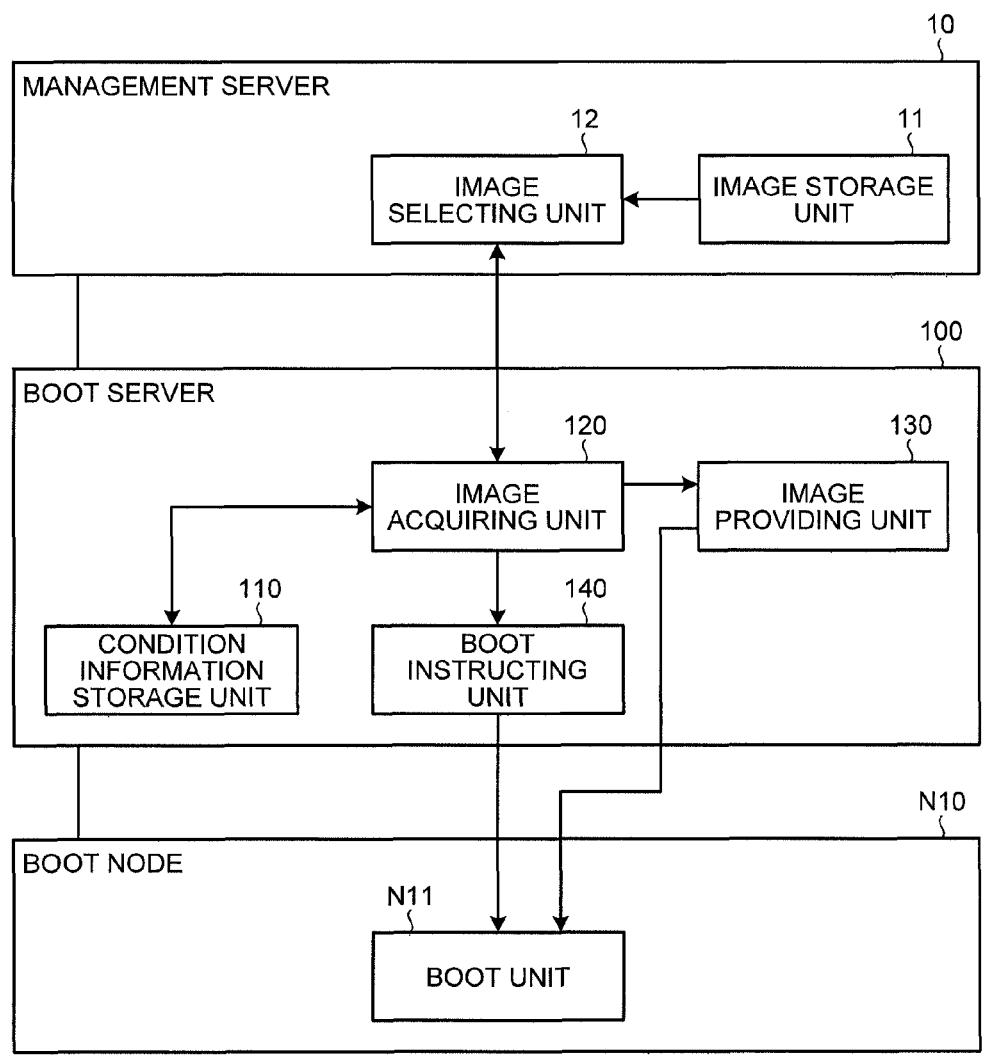
FIG. 2 is a diagram illustrating the configuration of a management server, a boot server, and a boot node according to the first embodiment.

Next, it will be explained about the configuration of the management server 10, the boot server 100, and the boot node N10 according to the first embodiment with reference to FIG. 2. FIG. 2 is a diagram illustrating the configuration of the management server 10, the boot server 100, and the boot node N10 according to the first embodiment.

As illustrated in FIG. 2, the management server 10 includes an image storage unit 11 and an image selecting unit 12. The image storage unit 11 stores therein boot images in association with the condition information of the boot nodes. FIG. 3 illustrates an example of the image storage unit 11. As illustrated in FIG. 3, the image storage unit 11 has items such as for example "condition information" and "boot image".

"Condition information" is a condition for specifying a boot image corresponding to the boot node N10. In an example illustrated in FIG. 3, "condition information" is a combination of "Model name" and "RAID (Redundant Arrays of Inexpensive) Card". "Model name" is a model name for the boot node N10. "RAID Card" is information that indicates whether the boot node N10 has a RAID card. In the first embodiment, RAID Card "Yes" indicates that the boot node N10 has a RAID card and RAID Card "No" indicates that the boot node N10 does not have a RAID card.

"Boot image" is a file name for a boot image. For example, "boot image" indicates a file name or the like that includes a device name and a directory name (or folder name) in which a boot image is stored.

The first line of the image storage unit 11 illustrated in FIG. 3 indicates that Model name is "M1" and a boot image corresponding to the boot node N10 having a RAID card is "IM1". Moreover, the second line of the image storage unit 11 illustrated in FIG. 3 indicates that Model name is "M1" and a boot image corresponding to the boot node N10 not having a RAID card is "IM2".

When receiving a request (hereinafter, "image acquisition request") of acquiring a boot image from the boot server 100, the image selecting unit 12 selects a boot image corresponding to condition information included in the image acquisition request from the image storage unit 11. Then, the image selecting unit 12 transmits the selected boot image to the boot server 100.

For example, it is assumed that the image storage unit 11 has the state illustrated in FIG. 3. Moreover, it is assumed that the management server 10 receives from the boot server 100 an image acquisition request that includes condition information in which Model name is "M1" and RAID Card is "Yes". In this case, the image selecting unit 12 selects the boot image "IM1" stored in association with the Model name "M1" and the RAID Card "Yes" from the image storage unit 11. Then, the image selecting unit 12 transmits the selected boot image "IM1" to the boot server 100.

As illustrated in FIG. 2, the boot server 100 includes a condition information storage unit 110, an image acquiring unit 120, an image providing unit 130, and a boot instructing unit 140. The condition information storage unit 110 stores therein condition information for the boot node N10 in association with identification information for identifying the boot node N10. FIG. 4 illustrates an example of the condition information storage unit 110. As illustrated in FIG. 4, the condition information storage unit 110 has items such as for example "MAC address" and "condition information".

"MAC address" is a MAC address for the boot node N10. In the example of the condition information storage unit 110 illustrated in FIG. 4, it is assumed that "MAC address" indicates the reference numbers "N10a-1 to N10n-1, N10a-2 to N10n-2, and N10a-n to N10n-n" for the boot nodes of FIG. 1. "Condition information" is condition information for the boot node N10 and corresponds to "condition information" illustrated in FIG. 3.

The first line of the condition information storage unit 110 illustrated in FIG. 4 indicates that condition information for the boot node N10a-1 has Model name "M1" and RAID Card "Yes". Moreover, the second line of the condition information storage unit 110 illustrated in FIG. 4 indicates that condition information for the boot node N10b-1 has Model name "M2" and RAID Card "Yes".

The example illustrated in FIG. 4 indicates that the condition information storage unit 110 stores "condition information" in association with "MAC address". On the other hand, the condition information storage unit 110 may store "condition information" in association with "IP address" or "model number" of the boot node N10 instead of "MAC address".

When receiving an instruction for performing a network boot on the boot node N10, the image acquiring unit 120 acquires the boot image corresponding to the boot node N10 from the management server 10.

Specifically, when receiving the instruction for performing the network boot on the boot node N10, the image acquiring unit 120 acquires the condition information for the boot node N10 from the condition information storage unit 110. Next, the image acquiring unit 120 transmits an image acquisition request including the acquired condition information to the image selecting unit 12 of the management server 10. The image selecting unit 12 selects a boot image corresponding to the condition information in response to the image acquisition request. The image acquiring unit 120 receives the boot image selected by the image selecting unit 12 from the management server 10. Then, the image acquiring unit 120 arranges the boot image received from the management server 10 in the image providing unit 130.

For example, it is assumed that the image storage unit 11 has the state illustrated in FIG. 3 and the condition information storage unit 110 has the state illustrated in FIG. 4. Moreover, it is assumed that the boot server 100 receives an instruction for performing a network boot on the boot node N10a-1. In this case, the image acquiring unit 120 acquires the Model name "M1" and the RAID Card "Yes" stored in association with the MAC address "N10a-1" of the boot node N10a-1 as condition information from the condition information storage unit 110.

Next, the image acquiring unit 120 transmits the image acquisition request including the Model name "M1" and the RAID Card "Yes" to the management server 10. Next, the image selecting unit 12 of the management server 10 selects the boot image "IM1" stored in association with the Model name "M1" and the RAID Card "Yes" from the image storage unit 11 in response to the image acquisition request. Next, the image selecting unit 12 transmits the boot image "IM1" to the image acquiring unit 120. Then, the image acquiring unit 120 arranges the received boot image "IM1" in the image providing unit 130.

The image providing unit 130 is a storage device such as a hard disk and a memory, and provides the boot image to the boot node N10. Specifically, the image providing unit 130 stores the boot image by the image acquiring unit 120. Then, the boot image stored in the image providing unit 130 is read by the boot node N10.

The boot instructing unit 140 instructs the boot node N10 to perform the network boot by using the boot image acquired by the image acquiring unit 120. Specifically, when the boot image is arranged in the image providing unit 130 by the image acquiring unit 120, the boot instructing unit 140 instructs the boot node N10 to perform the network boot.

As illustrated in FIG. 2, the boot node N10 includes a boot unit N11. When receiving the instruction for performing the network boot from the boot instructing unit 140 of the boot server 100, the boot unit N11 reads out the boot image from the image providing unit 130 and performs the network boot.

For example, like the example, it is assumed that the boot server 100 receives the instruction for performing the network boot on the boot node N10a-1 and the boot image "IM1" is arranged in the image providing unit 130 by the image acquiring unit 120. In this case, the boot node N10a-1 reads out the boot image "IM1" stored in the image providing unit 130 and performs the network boot.

Network Boot Process Procedures by Network Boot System 1 of First Embodiment

Figure 5:
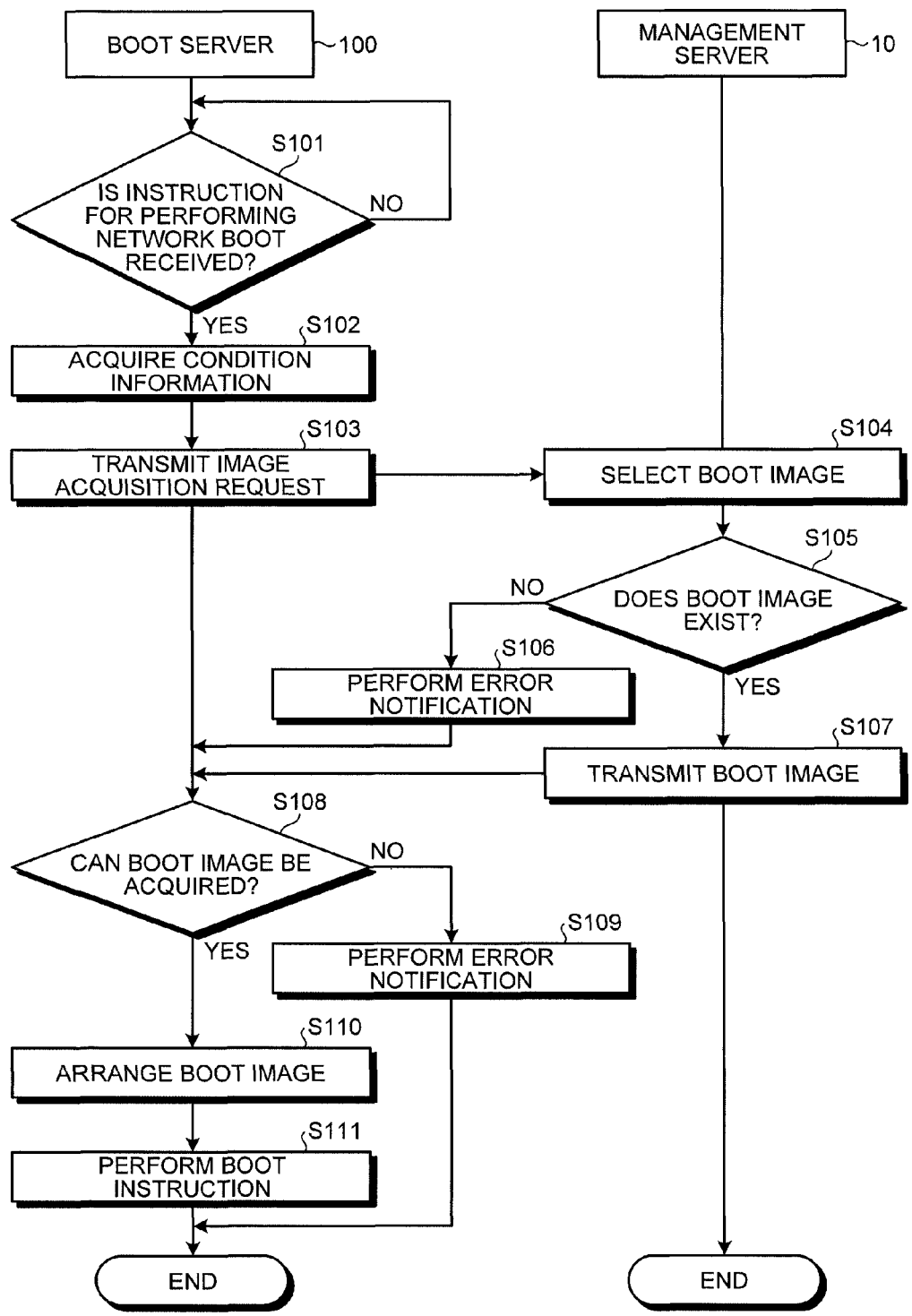
FIG. 5 is a sequence diagram illustrating network boot process procedures that are performed by the network boot system according to the first embodiment.

Next, it will be explained about network boot process procedures that are performed by the network boot system 1 according to the first embodiment with reference to FIG. 5. FIG. 5 is a sequence diagram illustrating network boot process procedures that are performed by the network boot system 1 according to the first embodiment.

As illustrated in FIG. 5, when receiving an instruction for performing a network boot on the boot node N10 (Step S101: YES), the image acquiring unit 120 of the boot server 100 acquires condition information for the boot node N10 that is a network boot target from the condition information storage unit 110 (Step S102). Next, the image acquiring unit 120 transmits an image acquisition request including the acquired condition information to the image selecting unit 12 of the management server 10 (Step S103).

Next, the image selecting unit 12 of the management server 10 selects a boot image stored in association with the condition information included in the image acquisition request from the image storage unit 11 (Step S104). When the boot image corresponding to the condition information is not in the image storage unit 11 (Step S105: NO), the image selecting unit 12 informs the boot server 100 of the existence of an error (Step S106). On the other hand, when the boot image corresponding to the condition information is in the image storage unit 11 (Step S105: YES), the image selecting unit 12 selects the boot image corresponding to the condition information from the image storage unit 11 and transmits the selected boot image to the boot server 100 (Step S107).

When the image acquiring unit 120 of the boot server 100 may not acquire a boot image by receiving an error notification from the management server 10 (Step S108: NO), the image acquiring unit 120 informs the boot node N10 of the existence of an error (Step S109). On the other hand, when the image acquiring unit 120 can acquire a boot image from the management server 10 (Step S108: YES), the image acquiring unit 120 arranges the acquired boot image in the image providing unit 130 (Step S110).

Then, the boot instructing unit 140 instructs the boot node N10 to perform the network boot (Step S111). The boot unit N11 of the boot node N10 that receives the instruction reads out the boot image stored in the image providing unit 130 and performs the network boot.

Application Example of Network Boot System 1 by First Embodiment

Figure 6:
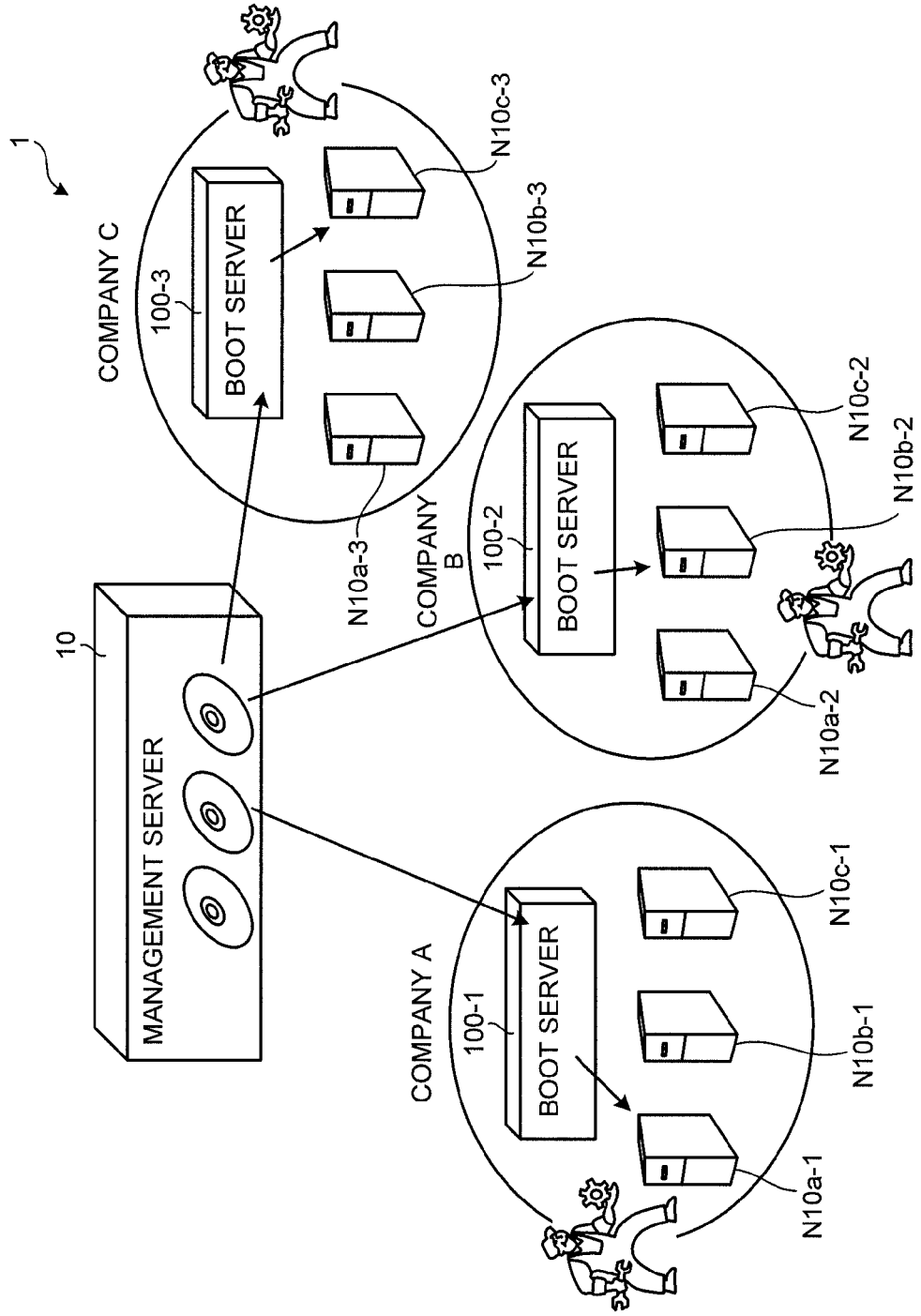
FIG. 6 is a diagram explaining an application example of the network boot system according to the first embodiment.

Next, it will be explained about an application example of the network boot system 1 according to the first embodiment with reference to FIG. 6. FIG. 6 is a diagram explaining an application example of the network boot system 1 according to the first embodiment. In an example illustrated in FIG. 6, it is assumed that a predetermined vendor "X" provides the network boot system 1 to companies "A to C". The network of the company "A" includes the boot server 100-1 and the boot nodes N10*a*-1, N10*b*-1, and N10*c*-1 as illustrated in FIG. 6. The network of the company "B" includes the boot server 100-2 and the boot nodes N10*a*-2 to N10*c*-2. The network of the company "C" includes the boot server 100-3 and the boot nodes N10*a*-3 to N10*c*-3.

In the network boot system 1, the vendor "X" generally employs a worker who performs maintenance management. Such a worker regularly checks network devices such as the boot node N10 that are provided to the companies "A to C" or repairs dead network devices. The worker may not generally use OS (Operating System) previously installed in the boot node N10 in many cases for the purpose of protecting security. Therefore, when performing a checkback or a repair, the worker activates OS for maintenance and then activates a program such as a diagnostic program for performing maintenance.

Herein, when a conventional network boot system is employed, a worker saves diagnostic programs and boot images that are OS for maintenance in a medium such as CD-ROM, DVD, and USB flash memory and performs a maintenance work by using the medium. Alternatively, when a diagnostic program and a boot image for maintenance are previously installed in the boot node N10, a worker performs a maintenance work by using the installed program.

However, maintenance costs for boot images increase in the conventional technique. For example, when the version of diagnostic programs or boot images for maintenance is changed, the vendor "X" remakes a medium in which the revised diagnostic programs or boot images for maintenance are stored. Moreover, similarly to the case where a diagnostic program and a boot image for maintenance are previously installed in the boot node N10, the vendor "X" applies the revised program to the boot node N10 of each of the companies "A to C".

On the other hand, when the network boot system 1 according to the first embodiment is employed, a worker does not take a lot of trouble with remaking the medium or updating the boot server 100 and the like even if the version of the diagnostic programs or the OS for maintenance is changed. Specifically, the management server 10 illustrated in FIG. 6 manages the diagnostic program and the OS for maintenance corresponding to the boot node N10. Then, when the worker performs the maintenance work on the boot node N10, the boot node N10 acquires the diagnostic program and the OS for maintenance from the management server 10 via the boot server 100 and activates the diagnostic program and the OS for maintenance. For this reason, even if the version of the diagnostic program or the OS for maintenance is changed, it is enough for the vendor "X" to update the diagnostic program and the OS for maintenance managed in the management server 10.

Effect of First Embodiment

As described above, the network boot system 1 according to the first embodiment can reduce maintenance costs for boot images because the management server 10 manages boot images used in networks in block.

In the first embodiment, it has been explained about a combination of the Model name of a boot node and the presence or absence of a RAID card as condition information. However, condition information may be information other than the case. FIG. 7 illustrates another example of condition information. As illustrated in FIG. 7, condition information may be the MAC address, the model name, the BIOS name, and the Firmware name of a boot node, the type of CPU, the vendor name of a RAID card, the version of the RAID card, and the like. The network boot system disclosed in the present application may use only one item as condition information or may use a combination of several items as condition information, among items illustrated in FIG. 7. For example, the network boot system 1 may use only the MAC address as condition information or may use a combination of the MAC address, the Model name, and the BIOS name as condition information.

Figure 9:
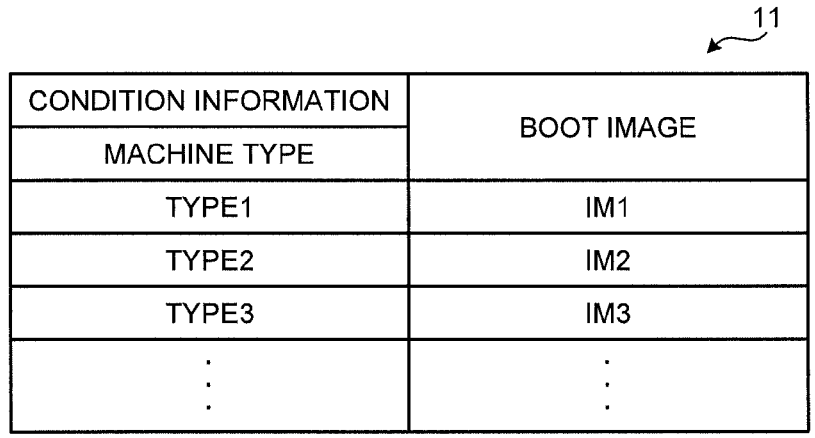
FIG. 9 is a diagram illustrating an example of the image storage unit when condition information is set optionally.

Condition information may be information that is optionally set by a system manager. FIG. 8 illustrates an example of the condition information storage unit 110 when condition information is set optionally. FIG. 9 illustrates an example of the image storage unit 11 when condition information is set optionally.

As illustrated in FIG. 8, the condition information storage unit 110 stores "machine type" as condition information in association with the MAC address of the boot node N10. Herein, "machine type" is information that is optionally set by the system manager. For example, when the same boot image is used for the boot nodes N10b-1 and N10c-1, the system manager sets the same information for the machine types of the boot nodes N10b-1 and N10c-1. In an example illustrated in FIG. 8, the system manager sets "TYPE 2" for the machine types of the boot nodes N10b-1 and N10c-1.

As illustrated in FIG. 9, the image storage unit 11 stores a boot image in association with "machine type". For example, when the condition information storage unit 110 has the state illustrated in FIG. 8 and the image storage unit 11 has the state illustrated in FIG. 9, the boot image corresponding to the boot nodes N10b-1 and N10c-1 is "IM2".

[b] Second Embodiment

In the first embodiment, it has been explained about the case where the boot server 100 manages condition information for the boot node N10. However, a boot node itself may acquire condition information. Therefore, in the second embodiment, it will be explained about the case where a boot node acquires condition information.

Configuration of Management Server, Boot Server, and Boot Node

Figure 10:
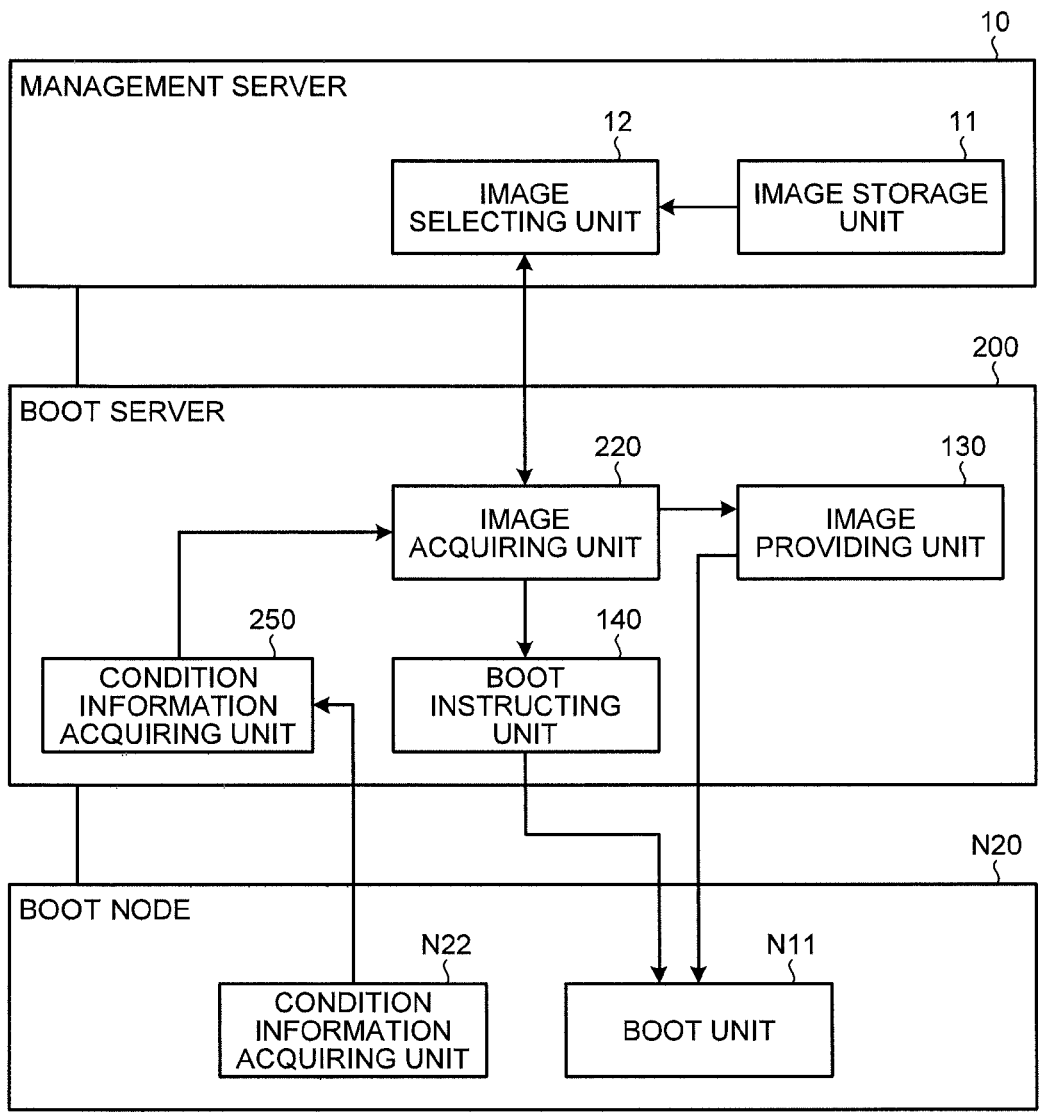
FIG. 10 is a diagram illustrating the configuration of a management server, a boot server, and a boot node according to a second embodiment.

First, it will be explained about the configuration of the management server 10, a boot server 200, and a boot node N20 according to the second embodiment with reference to FIG. 10. FIG. 10 is a diagram illustrating the configuration of the management server 10, the boot server 200, and the boot node N20 according to the second embodiment. The configuration of a network boot system 2 according to the second embodiment is similar to that of the network boot system 1 illustrated in FIG. 1. Hereinafter, components having the same functions as those of the already-illustrated components have the same reference numbers, and the detailed descriptions are omitted.

As illustrated in FIG. 10, the boot node N20 includes a condition information acquiring unit N22. It is assumed that the boot node N20 according to the second embodiment has a constantly operable management board even if the power supply of the boot node N20 is not applied. It is assumed that the management board has the condition information acquiring unit N22. In other words, the condition information acquiring unit N22 can perform a process even if the power supply is not applied to the boot node N20.

When receiving an instruction for acquiring condition information from a condition information acquiring unit 250 to be described below, the condition information acquiring unit N22 acquires the condition information for the boot node N20. For example, the condition information acquiring unit N22 acquires information on the hardware configuration of the boot node N20 as condition information. The condition information acquiring unit N22 according to the second embodiment acquires, as condition information, the Model name of the boot node N20 and information on whether the boot node N20 has the RAID Card.

As illustrated in FIG. 10, the boot server 200 includes an image acquiring unit 220 and the condition information acquiring unit 250. When receiving an instruction for performing a network boot on the boot node N20, the condition information acquiring unit 250 instructs the condition information acquiring unit N22 of the boot node N20 to acquire condition information and then acquires the condition information from the condition information acquiring unit N22.

In the second embodiment, it has been explained assuming that the condition information acquiring unit 250 receives the instruction for performing the network boot on the boot node N20. However, the condition information acquiring unit N22 may receive the instruction for performing the network boot on the boot node N20. In this case, when receiving the instruction for performing the network boot on the boot node N20, the condition information acquiring unit N22 acquires condition information for the boot node N20 and transmits the acquired condition information to the condition information acquiring unit 250 to be described below.

The image acquiring unit 220 transmits, to the management server 10, an image acquisition request that includes the condition information for the boot node N20 that is acquired by the condition information acquiring unit 250. Then, the image acquiring unit 220 acquires a boot image selected by the image selecting unit 12 from the management server 10 and arranges the acquired boot image in the image providing unit 130.

Network Boot Process Procedures of Network Boot System 2 by Second Embodiment

Figure 11:
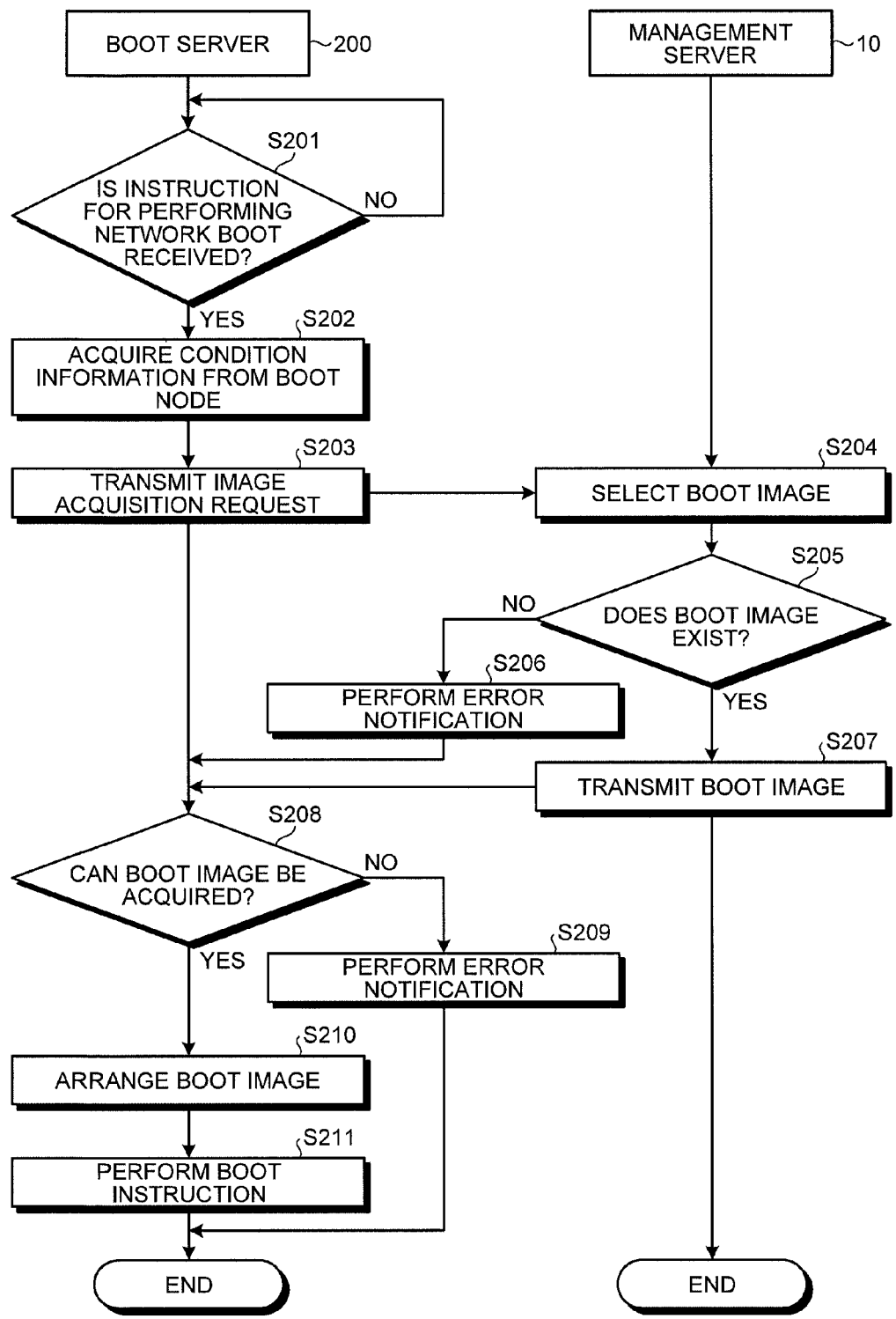
FIG. 11 is a sequence diagram illustrating network boot process procedures that are performed by a network boot system according to the second embodiment.

Next, it will be explained about network boot process procedures that are performed by the network boot system 2 according to the second embodiment with reference to FIG. 11. FIG. 11 is a sequence diagram illustrating network boot process procedures that are performed by the network boot system 2 according to the second embodiment.

As illustrated in FIG. 11, when receiving an instruction for performing a network boot on the boot node N20 (Step S201: YES), the condition information acquiring unit 250 of the boot server 200 acquires condition information for the boot node N20 from the condition information acquiring unit N22 (Step S202).

Next, the image acquiring unit 220 of the boot server 200 transmits an image acquisition request including the condition information for the boot node N20 acquired by the condition information acquiring unit 250 to the management server 10 (Step S203). Processing procedures of the subsequent Steps S204 to S211 are similar to those of Steps S104 to S111 illustrated in FIG. 5.

Effect of Second Embodiment

As described above, the network boot system 2 according to the second embodiment can reduce maintenance costs for boot images because the management server 10 manages boot images used in networks in block. Furthermore, because the network boot system 2 according to the second embodiment acquires condition information for the boot node N20 from the boot node N20 itself, the boot server 200 may not save condition information. In other words, when condition information for the boot node N20 is modified in the network boot system 2 according to the second embodiment, it is enough for a system manager to perform maintenance on the image storage unit 11 of the management server 10. In this way, the network boot system 2 according to the second embodiment can further reduce maintenance costs for boot images.

[c] Third Embodiment

In the second embodiment, it has been explained about the case where the condition information acquiring unit 250 acquires condition information from the boot node N20. Such the condition information acquiring unit 250 can be realized by a program in some cases. In other words, when a program for realizing the condition information acquiring unit 250 has a bug or a version upgrade, the program is updated. In the third embodiment, it will be explained about the case where the condition information acquiring unit 250 is updated.

Configuration of Management Server, Boot Server, and Boot Node

Figure 12:
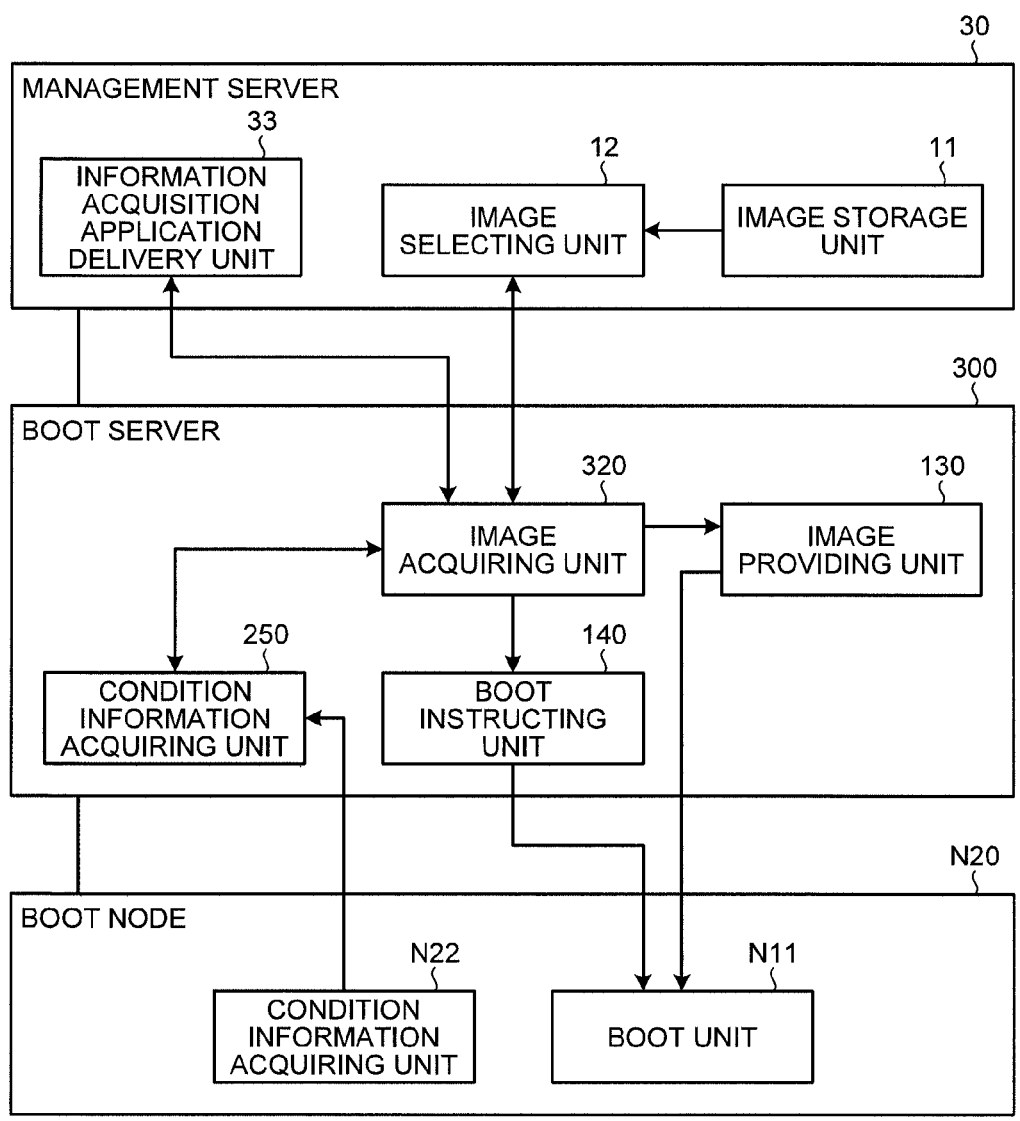
FIG. 12 is a diagram illustrating the configuration of a management server, a boot server, and a boot node according to a third embodiment.

First, it will be explained about the configuration of a management server 30, a boot server 300, and the boot node N20 according to the third embodiment with reference to FIG. 12. FIG. 12 is a diagram illustrating the configuration of the management server 30, the boot server 300, and the boot node N20 according to the third embodiment. Herein, the configuration of a network boot system 3 according to the third embodiment is similar to that of the network boot system 1 illustrated in FIG. 1.

As illustrated in FIG. 12, the management server 30 includes an information acquisition application delivery unit 33. The information acquisition application delivery unit 33 stores therein a program (hereinafter, "information acquisition application") for realizing the condition information acquiring unit 250 of the boot server 300 and delivers the information acquisition application to the boot server 300. For example, when the information acquisition application is updated, the information acquisition application delivery unit 33 delivers the updated information acquisition application to the boot server 300.

As illustrated in FIG. 12, the boot server 300 includes an image acquiring unit 320. The image acquiring unit 320 acquires the information acquisition application from the information acquisition application delivery unit 33 of the management server 30, and updates the condition information acquiring unit 250 by using the acquired information acquisition application.

Figure 13:
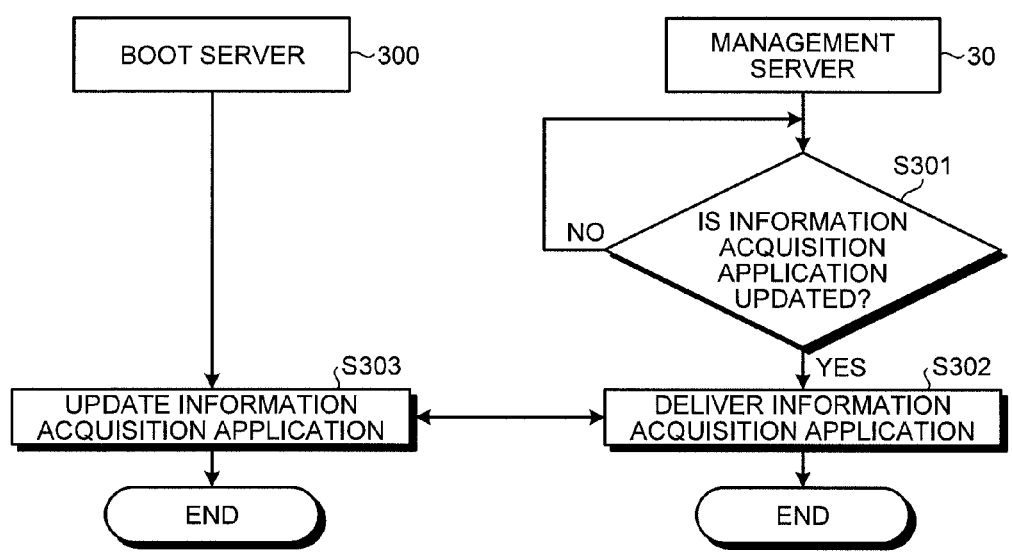
FIG. 13 is a sequence diagram illustrating information acquisition application updating process procedures that are performed by a network boot system according to the third embodiment.

Information Acquisition Application Updating Process Procedures of Network Boot System 3 by Third Embodiment Next, it will be explained about information acquisition application updating process procedures that are performed by the network boot system 3 according to the third embodiment with reference to FIG. 13. FIG. 13 is a sequence diagram illustrating information acquisition application updating process procedures that are performed by the network boot system 3 according to the third embodiment. Herein, network boot process procedures that are performed by the network boot system 3 according to the third embodiment are similar to the processing procedures illustrated in FIG. 11.

As illustrated in FIG. 13, when an information acquisition application is updated (Step S301: YES), the information acquisition application delivery unit 33 of the management server 30 delivers the updated information acquisition application to the boot server 300 (Step S302).

Next, the image acquiring unit 320 of the boot server 300 acquires the information acquisition application from the information acquisition application delivery unit 33, and updates the condition information acquiring unit 250 by using the acquired information acquisition application (Step S303).

Effect of Third Embodiment

As described above, the network boot system 3 according to the third embodiment can reduce maintenance costs for boot images because the management server 30 manages boot images used in networks in block. Furthermore, in the network boot system 3 according to the third embodiment, the management server 30 manages information acquisition applications in block. As a result, when the version of an information acquisition application is changed in the network boot system 3 according to the third embodiment, it is enough for a system manager to perform maintenance on the information acquisition application delivery unit 33 of the management server 30. Therefore, the network boot system 3 according to the third embodiment can reduce maintenance costs for information acquisition applications.

In the third embodiment, it has been explained about the case where, when an information acquisition application is updated, the information acquisition application delivery unit 33 delivers the updated information acquisition application to the boot server 300. However, it is enough that the information acquisition application delivery unit 33 saves information acquisition applications. In this case, when receiving the instruction for performing the network boot on the boot node N20, the image acquiring unit 320 of the boot server 300 acquires the latest information acquisition application from the information acquisition application delivery unit 33.

[d] Fourth Embodiment

In the second and third embodiments, it has been explained about the case where the condition information acquiring unit N22 of the boot node N20 acquires condition information assuming that the boot node N20 has a management board. However, any boot node may not have a management board. Therefore, in the fourth embodiment, it will be explained about the case where a boot node not having a management board acquires condition information.

Configuration of Management Server, Boot Server, and Boot Node

Figure 14:
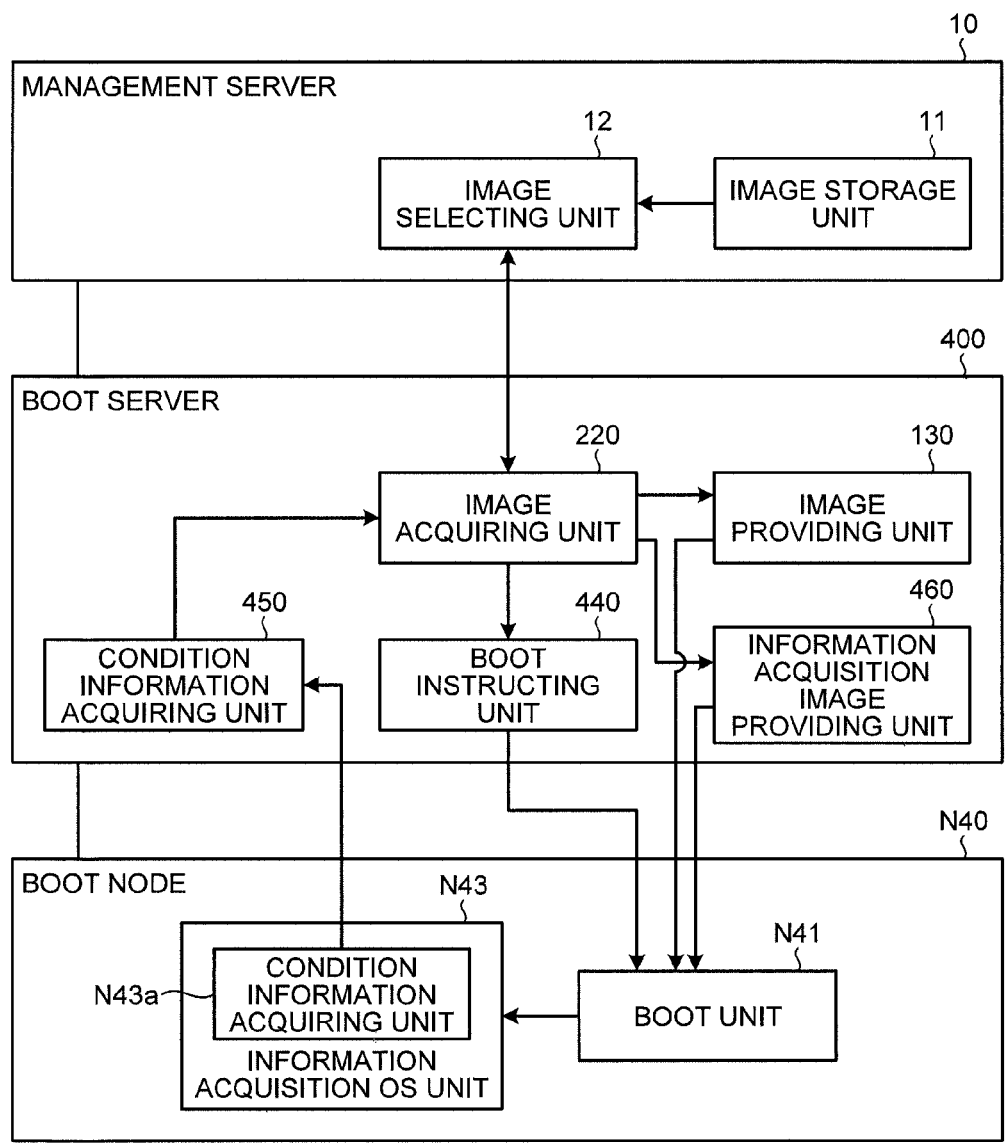
FIG. 14 is a diagram illustrating the configuration of a management server, a boot server, and a boot node according to a fourth embodiment.

First, it will be explained about the brief of a process performed by the management server 10, a boot server 400, and a boot node N40 and the configuration of them according to the fourth embodiment with reference to FIG. 14. FIG. 14 is a diagram illustrating the configuration of the management server 10, the boot server 400, and the boot node N40 according to the fourth embodiment. The configuration of a network boot system 4 according to the fourth embodiment is similar to that of the network boot system 1 illustrated in FIG. 1.

At the beginning, it will be explained about the brief of a process that is performed by the management server 10, the boot server 400, and the boot node N40 according to the fourth embodiment. It is assumed that the boot node N40 illustrated in FIG. 14 does not have a management board and thus may not acquire condition information when a predetermined basic program is not activated.

When receiving an instruction for performing a network boot on the boot node N40, the boot server 400 instructs the boot node N40 to activate a basic program (hereinafter, "information acquisition OS") that controls a condition information acquisition process. The boot node N40 that receives the instruction activates the information acquisition OS and acquires condition information for the boot node N40. Next, the boot server 400 acquires the condition information from the boot node N40, acquires a boot image corresponding to the boot node N40 from the management server 10, and provides the acquired boot image to the boot node N40. Then, the boot node N40 reads out the boot image provided from the boot server 400 and performs the network boot.

Next, it will be explained about the configuration of the boot server 400 and the boot node N40 illustrated in FIG. 14. As illustrated in FIG. 14, the boot server 400 includes a condition information acquiring unit 450, a boot instructing unit 440, and an information acquisition image providing unit 460.

The information acquisition image providing unit 460 provides the boot image for the information acquisition OS to the boot node N40. The information acquisition OS is a simple OS that can be activated on the boot node N40 regardless of the hardware configuration of the boot node N40.

When receiving the instruction for performing the network boot on the boot node N40, the boot instructing unit 440 instructs the boot node N40 to activate the information acquisition OS. Moreover, when the boot image is arranged in the image providing unit 130 by the image acquiring unit 220, the boot instructing unit 440 instructs the boot node N40 to perform the network boot.

The condition information acquiring unit 450 acquires condition information from a condition information acquiring unit N43a of the boot node N40 to be described below.

As illustrated in FIG. 14, the boot node N40 newly includes a boot unit N41 instead of the boot unit N11 as compared to the boot node N20 illustrated in FIG. 10. Moreover, the boot node N40 newly includes an information acquisition OS unit N43 as compared to the boot node N20 illustrated in FIG. 10.

When receiving an instruction for activating the information acquisition OS from the boot instructing unit 440 of the boot server 400, the boot unit N41 reads out the boot image for the information acquisition OS from the information acquisition image providing unit 460 of the boot server 400 to activate the information acquisition OS unit N43. Moreover, when receiving the instruction for performing the network boot from the boot instructing unit 440, the boot unit N41 reads out the boot image from the image providing unit 130 to perform reboot.

The information acquisition OS unit N43 is an operating system that is activated to acquire condition information and includes the condition information acquiring unit N43a. The condition information acquiring unit N43a is controlled by the information acquisition OS unit N43 to acquire the condition information for the boot node N40.

Network Boot Process Procedures of Network Boot System 4 by Fourth Embodiment

Figure 15:
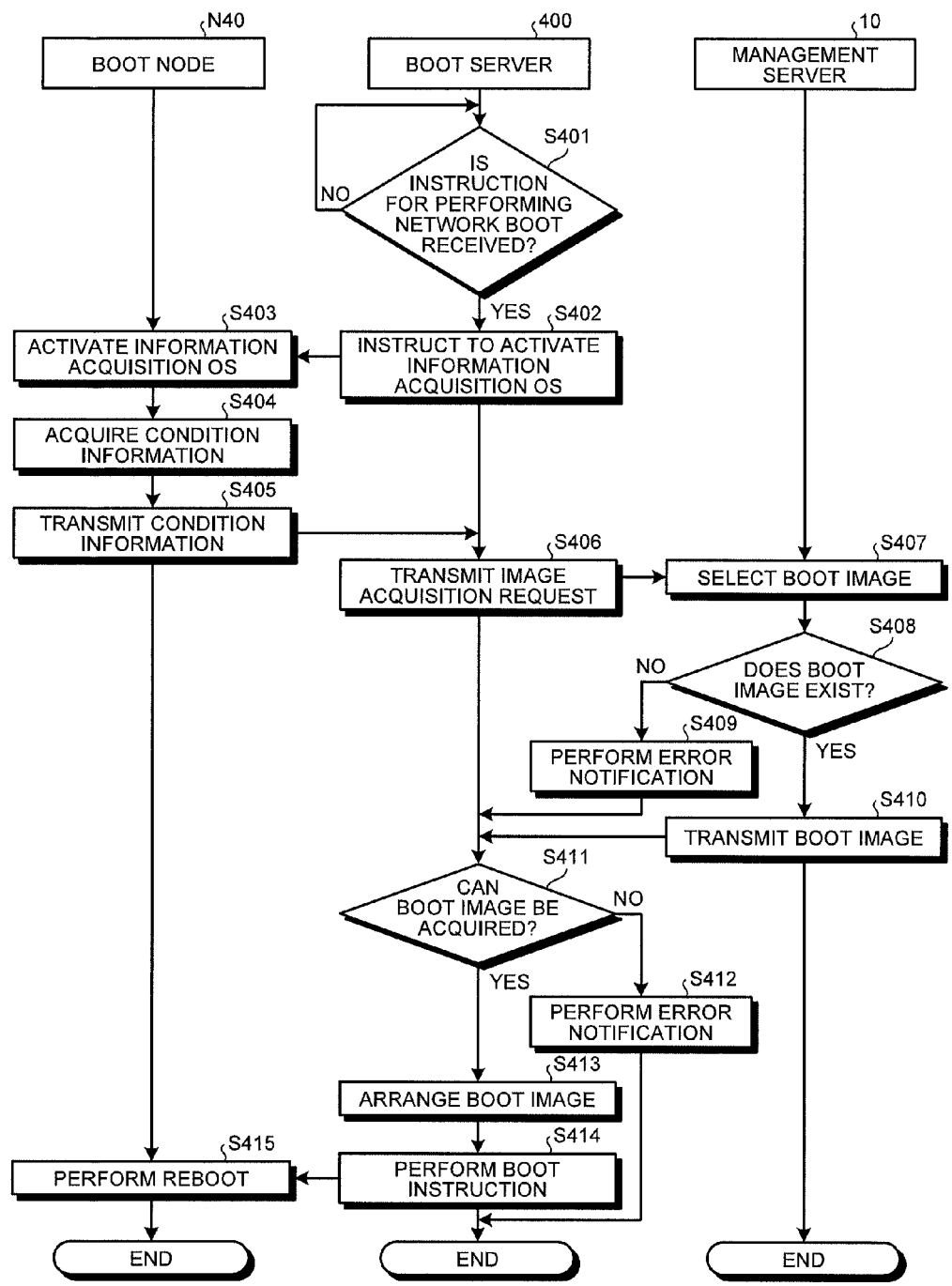
FIG. 15 is a sequence diagram illustrating network boot process procedures that are performed by a network boot system according to the fourth embodiment.

Next, it will be explained about network boot process procedures that are performed by the network boot system 4 according to the fourth embodiment with reference to FIG. 15. FIG. 15 is a sequence diagram illustrating network boot process procedures that are performed by the network boot system 4 according to the fourth embodiment.

As illustrated in FIG. 15, when receiving an instruction for performing a network boot on the boot node N40 (Step S401: YES), the boot instructing unit 440 of the boot server 400 instructs the boot node N40 to activate an information acquisition OS (Step S402).

The boot unit N41 of the boot node N40 that receives the instruction reads out a boot image for the information acquisition OS from the information acquisition image providing unit 460 of the boot server 400 and activates the information acquisition OS unit N43 (Step S403).

Next, the condition information acquiring unit N43a of the boot node N40 acquires condition information for the boot node N40 (Step S404) and transmits the acquired condition information to the condition information acquiring unit 450 of the boot server 400 (Step S405).

Next, the image acquiring unit 220 of the boot server 400 acquires the condition information for the boot node N40 from the condition information acquiring unit 450 and transmits an image acquisition request including the acquired condition information to the management server 10 (Step S406). Processing procedures of the subsequent Steps S407 to S413 are similar to those of Steps S104 to S110 illustrated in FIG. 5.

Then, when the boot image is arranged in the image providing unit 130 by the image acquiring unit 220 (Step S413), the boot instructing unit 440 of the boot server 400 instructs the boot node N40 to perform a network boot (Step S414).

The boot unit N41 of the boot node N40 that receives the instruction reads out the boot image from the image providing unit 130 of the boot server 400 and performs a network boot (reboot) (Step S415).

Effect of Fourth Embodiment

As described above, the network boot system 4 according to the fourth embodiment can reduce maintenance costs for boot images because the management server 10 manages boot images used in networks in block. Furthermore, in the network boot system 4 according to the fourth embodiment, the boot node N40 activates a basic program (information acquisition OS) that controls a process for acquiring condition information to acquire the condition information. As a result, in the network boot system 4 according to the fourth embodiment, the boot server 400 can acquire condition information from the boot node N40 even if the boot node N40 does not have a management board. In other words, when the condition information for the boot node N40 is modified in the network boot system 4 according to the fourth embodiment, it is enough for a system manager to perform maintenance on the image storage unit 11 of the management server 10. In this way, the network boot system 4 according to the fourth embodiment can further reduce maintenance costs for boot images even if the boot node N40 does not have a management board.

In the fourth embodiment, the management server 10 may have the information acquisition application delivery unit 33 illustrated in FIG. 12. In this case, the image acquiring unit 220 of the boot server 400 acquires an information acquisition application from the information acquisition application delivery unit 33 and updates the condition information acquiring unit 450 by using the acquired information acquisition application.

[e] Fifth Embodiment

In the fourth embodiment, it has been explained about the case where the boot server 400 previously saves an information acquisition OS. However, the boot server may acquire an information acquisition OS from the management server. Therefore, in the fifth embodiment, it will be explained about the case where a boot server acquires an information acquisition OS from a management server.

Configuration of Management Server, Boot Server, and Boot Node

Figure 16:
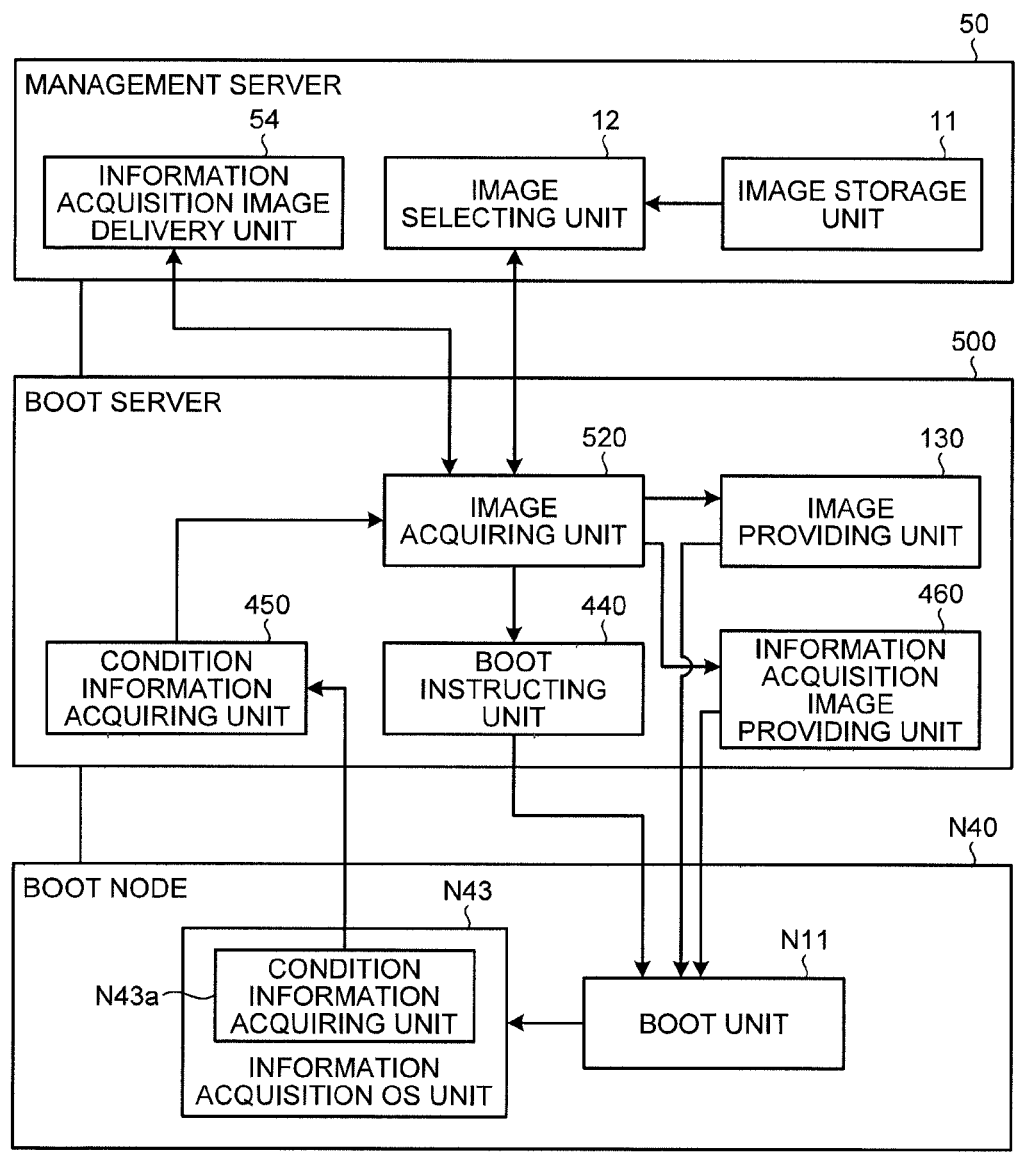
FIG. 16 is a diagram illustrating the configuration of a management server, a boot server, and a boot node according to a fifth embodiment.

First, it will be explained about the configuration of a management server 50, a boot server 500, and the boot node N40 according to the fifth embodiment with reference to FIG. 16. FIG. 16 is a diagram illustrating the configuration of the management server 50, the boot server 500, and the boot node N40 according to the fifth embodiment. Herein, the configuration of a network boot system 5 according to the fifth embodiment is similar to that of the network boot system 1 illustrated in FIG. 1.

As illustrated in FIG. 16, the management server 50 includes an information acquisition image delivery unit 54. The information acquisition image delivery unit 54 provides the boot image for an information acquisition OS to the boot server 500.

As illustrated in FIG. 16, the boot server 500 includes an image acquiring unit 520. When receiving an instruction for performing a network boot on the boot node N40, the image acquiring unit 520 acquires the boot image for the information acquisition OS from the information acquisition image delivery unit 54 of the management server 50 and arranges the acquired boot image for the information acquisition OS in the information acquisition image providing unit 460.

Figure 17:
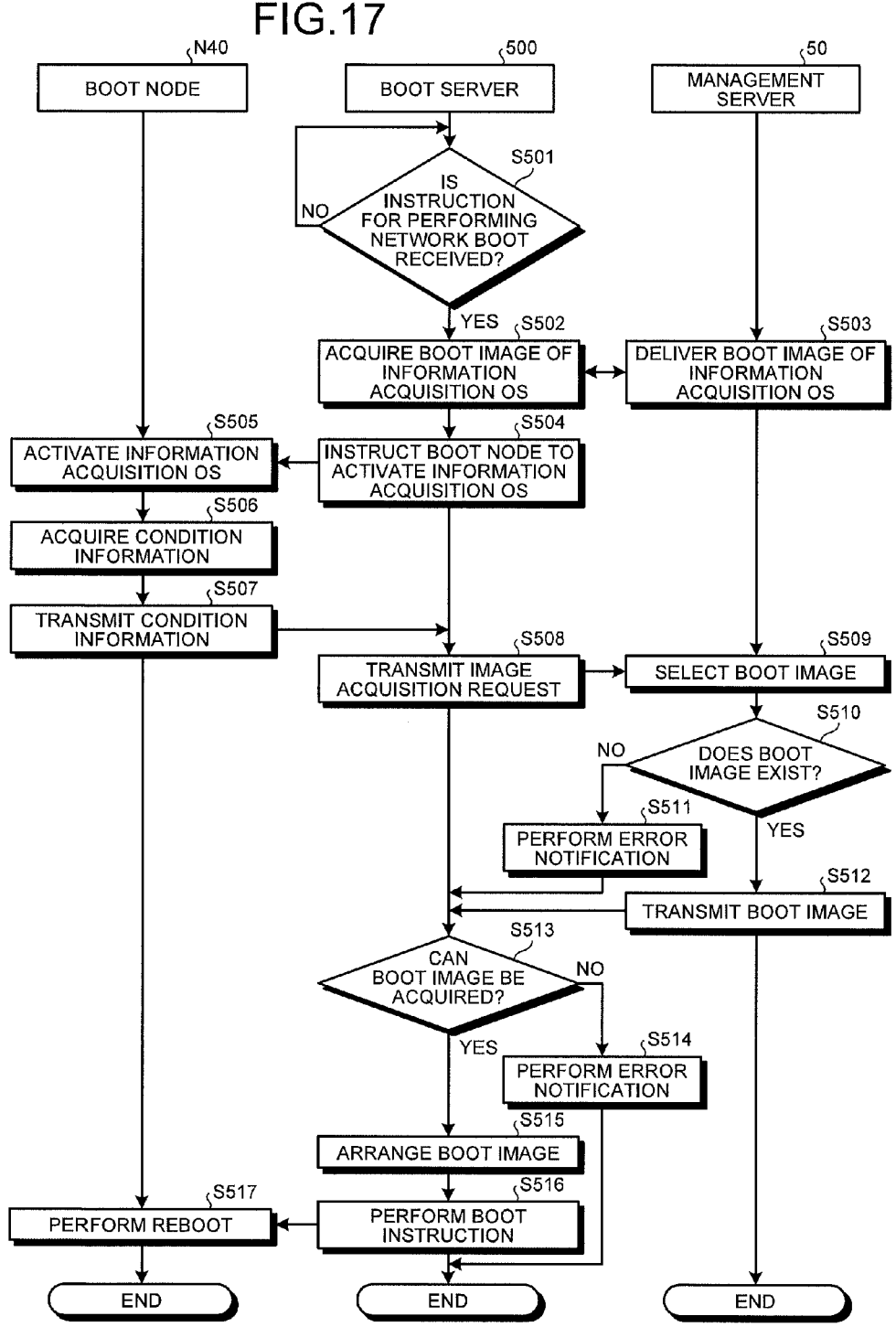
FIG. 17 is a sequence diagram illustrating network boot process procedures that are performed by a network boot system according to the fifth embodiment.

Network Boot Process Procedures of Network Boot System 5 by Fifth Embodiment Next, it will be explained about network boot process procedures that are performed by the network boot system 5 according to the fifth embodiment with reference to FIG. 17. FIG. 17 is a sequence diagram illustrating network boot process procedures that are performed by the network boot system 5 according to the fifth embodiment.

As illustrated in FIG. 17, when receiving an instruction for performing a network boot on the boot node N40 (Step S501: YES), the image acquiring unit 520 of the boot server 500 acquires the boot image for an information acquisition OS from the management server 50 (Steps S502 and S503).

Next, the boot instructing unit 440 of the boot server 500 instructs the boot node N40 to activate the information acquisition OS (Step S504). Processing procedures of the subsequent Steps S505 to S517 are similar to those of Steps S403 to S415 illustrated in FIG. 15.

Effect of Fifth Embodiment

As described above, the network boot system 5 according to the fifth embodiment can reduce maintenance costs for boot images because the management server 50 manages boot images used in networks in block. Furthermore, in the network boot system 5 according to the fifth embodiment, the management server 50 manages boot images for information acquisition OS in block. As a result, even if the version of the boot image for an information acquisition OS is changed in the network boot system 5 according to the fifth embodiment, it is enough to perform maintenance on the information acquisition image delivery unit 54 of the management server 50. Therefore, the network boot system 5 according to the fifth embodiment can reduce maintenance costs for boot images of information acquisition OS.

[f] Sixth Embodiment

Meanwhile, the network boot system disclosed in the present application may be realized by various different configurations in addition to the embodiments described above. Therefore, in the sixth embodiment, it will be explained about another embodiment of the network boot system disclosed in the present application.

Condition Information

The boot server described above may include both of the condition information storage unit 110 described in the first embodiment and the condition information acquiring unit 250 described in the second embodiment. In this way, the boot server may transmit to the management server 10 an image acquisition request that includes information obtained by combining condition information stored in the condition information storage unit 110 and condition information acquired by the condition information acquiring unit 250.

Management Board

When the boot node described above has a management board, the boot node may include various processing units of the boot servers 100 to 500 described above instead of the boot servers 100 to 500. As a result, a network boot process performed by the network boot system according to the present application can be realized without providing a boot server in each network.

Figure 18:
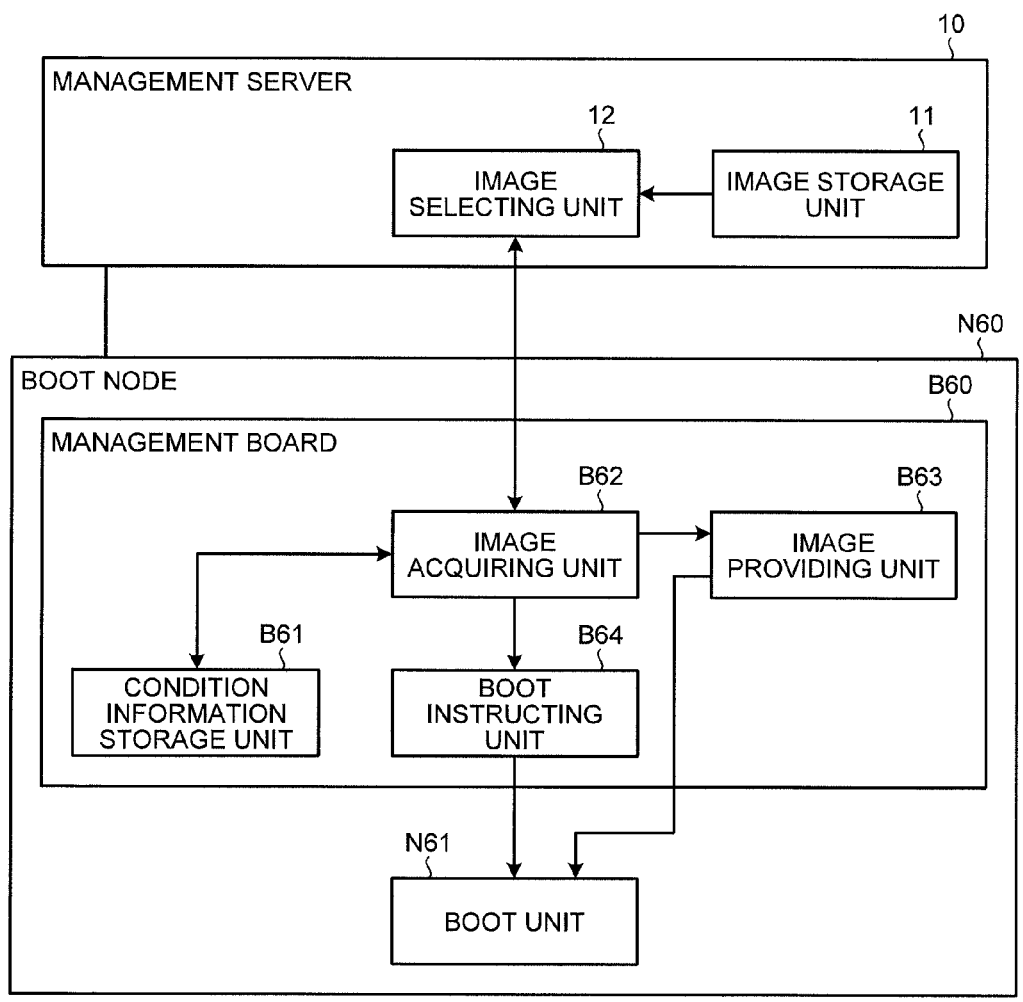
FIG. 18 is a diagram illustrating an example in which a boot node has various processing units of the boot server illustrated in FIG. 2.

FIG. 18 illustrates an example in which a boot node includes the various processing units of the boot server 100 illustrated in FIG. 2. As illustrated in FIG. 18, a boot node N60 includes a management board B60 and a boot unit N61. The management board B60 includes a condition information storage unit B61, an image acquiring unit B62, an image providing unit B63, and a boot instructing unit B64. The condition information storage unit B61, the image acquiring unit B62, the image providing unit B63, and the boot instructing unit B64 respectively correspond to the condition information storage unit 110, the image acquiring unit 120, the image providing unit 130, and the boot instructing unit 140 illustrated in FIG. 2. The boot unit N61 reads out a boot image from the image providing unit B63 to perform a network boot in accordance with the instruction of the boot instructing unit B64.

Other than the example illustrated in FIG. 18, the boot node may have various processing units of the boot servers 200 to 500. For example, it is explained about the network boot system 2 according to the second embodiment. In this case, the boot node N20 may have a management board that includes the image providing unit 130, the boot instructing unit 140, the image acquiring unit 220, and the condition information acquiring unit 250 illustrated in FIG. 10. In such an example, when the condition information acquiring unit 250 and the condition information acquiring unit N22 can be integrated, the boot node N20 may not have one of the condition information acquiring unit 250 and the condition information acquiring unit N22.

Program

Various types of processes explained in the first to fifth embodiments can be realized by executing a previously-prepared program by using a computer such as a personal computer and a workstation. Therefore, it will be explained about an example of a computer that executes a boot image selection program that has the same function as that of the management server 10 according to the first embodiment with reference to FIG. 19. Moreover, it will be explained about an example of a computer that executes a boot image provision program that has the same function as that of the boot server 100 according to the first embodiment with reference to FIG. 20.

Figure 19:
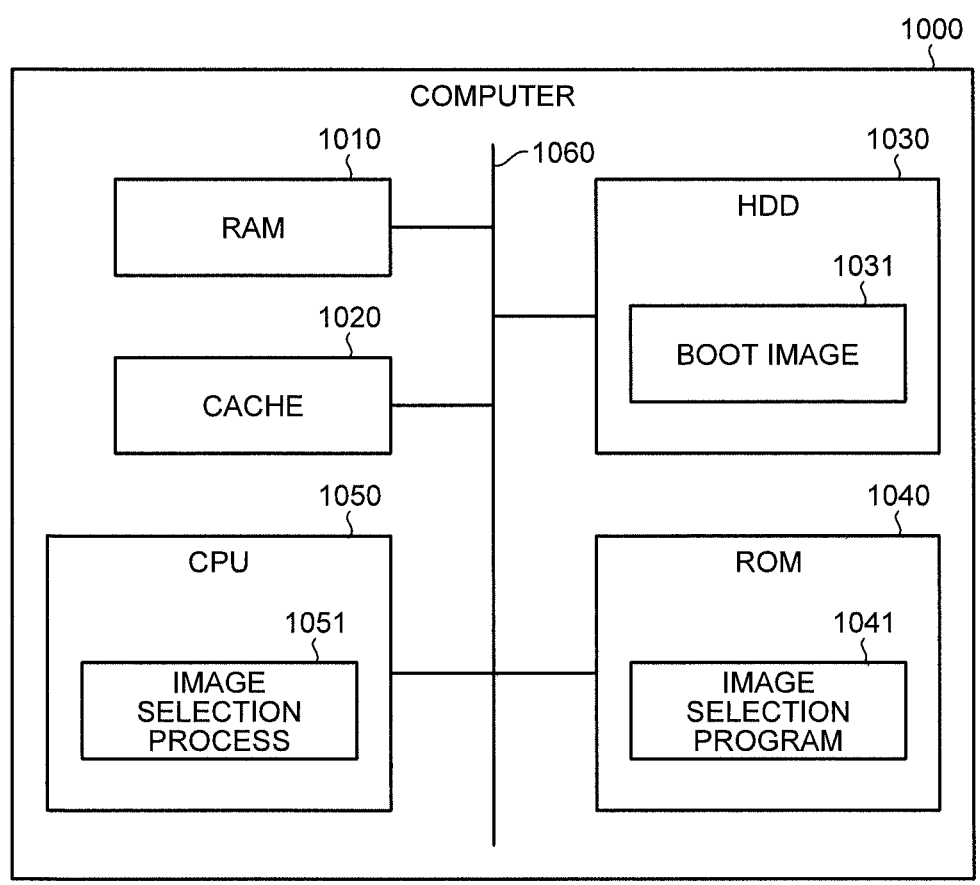
FIG. 19 is a diagram illustrating a computer that performs a boot image selection program.

FIG. 19 is a diagram illustrating a computer 1000 that executes a boot image selection program. As illustrated in FIG. 19, the computer 1000 includes a RAM (Random Access Memory) 1010, a cache 1020, an HDD 1030, a ROM (Read Only Memory) 1040, and a CPU (Central Processing Unit) 1050, which are connected through a bus 1060. The ROM 1040 previously stores therein an image selection program 1041 that exerts the same function as that of the management server 10 according to the first embodiment.

Then, the CPU 1050 reads out and executes the image selection program 1041. As a result, as illustrated in FIG. 19, the image selection program 1041 becomes an image selection process 1051. Herein, the image selection process 1051 corresponds to the image selecting unit 12 illustrated in FIG. 2.

As illustrated in FIG. 19, a boot image 1031 is provided in the HDD 1030. Herein, the boot image 1031 corresponds to the image storage unit 11 illustrated in FIG. 2.

Figure 20:
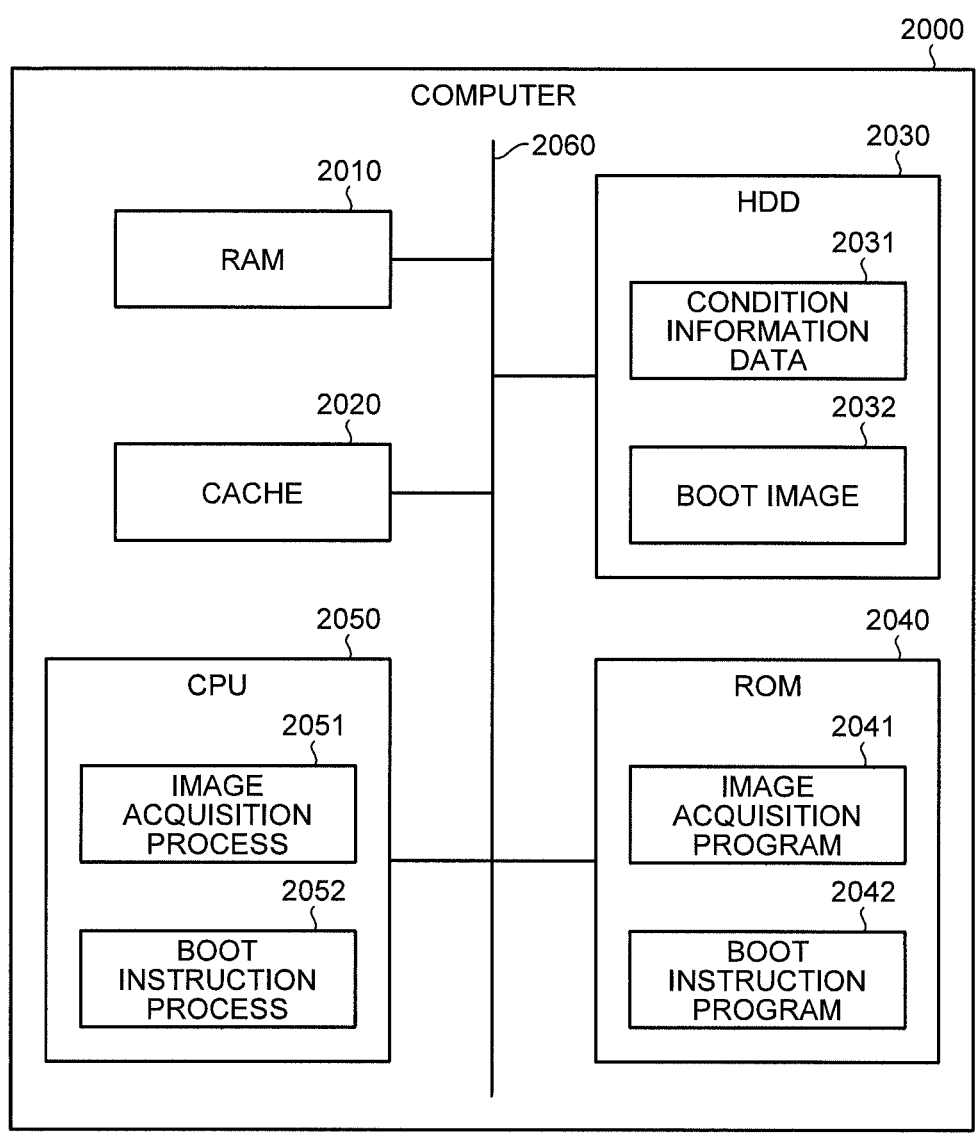
FIG. 20 is a diagram illustrating the computer that performs a boot image provision program.

Next, it will be explained about an example of a computer that executes a boot image provision program with reference to FIG. 20. FIG. 20 is a diagram illustrating a computer 2000 that executes a boot image provision program. As illustrated in FIG. 20, the computer 2000 includes a RAM 2010, a cache 2020, an HDD 2030, a ROM 2040, and a CPU 2050, which are connected through a bus 2060.

The ROM 2040 previously stores therein a boot image provision program, which exerts the same function as that of the boot server 100 according to the first embodiment, in other words, an image acquisition program 2041 and a boot instruction program 2042 as illustrated in FIG. 20.

Then, the CPU 2050 reads out and executes the image acquisition program 2041 and the boot instruction program 2042. As a result, as illustrated in FIG. 20, the image acquisition program 2041 and the boot instruction program 2042 respectively become an image acquisition process 2051 and a boot instruction process 2052. Herein, the image acquisition process 2051 corresponds to the image acquiring unit 120 illustrated in FIG. 2 and the boot instruction process 2052 corresponds to the boot instructing unit 140 illustrated in FIG. 2.

As illustrated in FIG. 20, a condition information data 2031 and a boot image 2032 are provided in the HDD 2030. Herein, the condition information data 2031 corresponds to the condition information storage unit 110 illustrated in FIG. 2 and the boot image 2032 corresponds to the image providing unit 130 illustrated in FIG. 2.

Meanwhile, the program 1041 or the programs 2041 and 2042 may not be necessarily stored in the ROM 1040 or 2040. For example, the program 1041 and the like may be stored in a "transportable physical medium" such as a flexible disk (FD), CD-ROM, a MO disk, a DVD disc, a magneto-optical disk, and an IC card that are inserted into the computer 1000 or 2000. Alternatively, the program 1041 and the like may be stored in a "fixed physical medium" such as a hard disk drive (HDD) that is provided inside and outside the computer 1000 or 2000. Furthermore, the program 1041 and the like may be stored in "another computer (or server)" that is connected to the computer 1000 or 2000 via a public line, an Internet, LAN, WAN, or the like. In this case, the computer 1000 or 2000 reads out each program from a flexible disk or the like described above and executes the read program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention

What is claimed is:

1. A management server comprising:
  an image storage unit that stores therein boot images in association with condition information that is conditions for specifying boot images corresponding to nodes that perform a network boot; and
  an image selecting unit that, when receiving an image acquisition request for acquiring a boot image from a boot server connected to a node, selects a boot image stored in association with condition information included in the received image acquisition request from the image storage unit and transmits the selected boot image to the boot server.

2. A network boot system:
  a management server;
  a boot server that is connected to nodes that perform a network boot, wherein
  the management server comprising:
    an image storage unit that stores therein boot images in association with condition information for specifying boot images corresponding to the nodes; and
    an image selecting unit that selects a boot image stored in the image storage unit on the basis of condition information included in an image acquisition request for acquiring a boot image received from the boot server, and
  the boot server comprising:
    an image acquiring unit that transmits an image acquisition request including condition information for the node to the management server when receiving an instruction for performing the network boot on any node, and acquires the boot image selected by the image selecting from the management server; and
    a boot instructing unit that instructs the node to perform the network boot by using the boot image acquired by the image acquiring unit.

3. The network boot system according to claim 2, wherein
  the boot server further comprises a condition information storage unit that stores therein condition information for the nodes in association with identification information for identifying the nodes, and
  the image acquiring unit acquires condition information stored in association with identification information of the any node from the condition information storage unit and transmits an image acquisition request including the acquired condition information to the management server.

4. The network boot system according to claim 2, wherein
  the boot server further comprises a condition information acquiring unit that acquires condition information for the any node from the any node, and
  the image acquiring unit transmits an image acquisition request including the condition information acquired by the condition information acquiring unit to the management server.

5. The network boot system according to claim 3, wherein
  the boot server further comprises a condition information acquiring unit that acquires condition information for the any node from the any node, and
  the image acquiring unit transmits to the management server an image acquisition request that includes information obtained by combining the condition information stored in the condition information storage unit in association with the identification information of the any node and the condition information acquired by the condition information acquiring unit.

6. The network boot system according to claim 4, wherein
  the management server further comprises an information acquisition application delivery unit that delivers to the boot server an information acquisition application that is a program for realizing the condition information acquiring unit of the boot server, and
  the image acquiring unit of the boot server acquires the information acquisition application from the information acquisition application delivery unit and updates the condition information acquiring unit by using the acquired information acquisition application.

7. The network boot system according to claim 4, wherein
  the boot server further comprises an information acquisition image providing unit that provides to the any node a boot image for a basic program for information acquisition that is a basic program that controls a condition information acquisition process performed by the any node, and
  the condition information acquiring unit acquires condition information from the any node when the any node activates the basic program for information acquisition by using the boot image provided by the information acquisition image providing unit.

8. The network boot system according to claim 7, wherein the management server further comprises an information acquisition image delivery unit that delivers the boot image for the basic program for information acquisition to the boot server, and the information acquisition image providing unit of the boot server provides the boot image for the basic program for information acquisition delivered by the information acquisition image delivery unit to the any node.

9. A network boot method performed by a management server and a boot server that is connected to nodes that perform a network boot, the network boot method comprising:

transmitting an image acquisition request for acquiring a boot image including condition information for a network boot target node from the boot server to the management server;

selecting, by the management server, a boot image corresponding to condition information from an image storage unit that stores therein the boot image on the basis of the condition information for specifying the boot image included in the image acquisition request received from the boot server;

acquiring, by the boot server, the boot image corresponding to the condition information included in the image acquisition request from the management server; and instructing, by the boot server, the network boot target node to perform the network boot by using the boot image acquired from the management server.

10. A non-transitory computer readable medium storing a boot image selection program that causes a computer to execute a process, the process comprising:

receiving an image acquisition request that is a request for acquiring a boot image from a boot server connected to nodes that perform a network boot; and selecting a boot image stored in association with condition information included in the received image acquisition request from an image storage unit that stores therein boot images in association with condition information that is conditions for specifying the boot images corresponding to the nodes and transmitting the selected boot image to the boot server.

11. A network boot system comprising:

a management server; and a boot server that is connected to nodes that perform a network boot, wherein the management server comprising:

a processor to execute a process, the process comprising:

selecting, when receiving an image acquisition request that is a request for acquiring a boot image from a boot server connected to nodes that perform a network boot, a boot image stored in association with condition information included in the image acquisition request from an image storage unit that stores therein boot images in association with condition information that is conditions for specifying the boot images corresponding to the nodes;

transmitting the selected boot image to the boot server, and the boot server comprising:

a processor to execute a process, the process comprising:

transmitting, when receiving an instruction for performing the network boot on any node, an image acquisition request including condition information for the node to the management server;

acquiring the selected boot image in accordance with the image acquisition request from the management server; and instructing the node to perform the network boot by using the acquired boot image.

* * * * *